United States Patent [19]
Jones et al.

[11] Patent Number: 5,623,146
[45] Date of Patent: Apr. 22, 1997

[54] THERMAL IMAGING DEVICE WITH SCANNED LIGHT EMITTING DIODES (LEDS) HAVING VARIABLE WIDTH GEOMETRY AND INTERLACING

[75] Inventors: Russell K. Jones, Manhattan Beach; Stephen P. Shaffer, West Hills; Robert Sendall, Chatsworth, all of Calif.

[73] Assignee: Hughes Electronics, Los Angeles, Calif.

[21] Appl. No.: 569,679

[22] Filed: Dec. 8, 1995

[51] Int. Cl.$^6$ ............................................. H04N 3/09
[52] U.S. Cl. ................................. 250/334; 250/332
[58] Field of Search ................................. 250/332, 334

[56] References Cited

U.S. PATENT DOCUMENTS

3,781,559  12/1973  Cooper et al. ................. 250/334
4,340,888  7/1982  Seroskie.

Primary Examiner—Carolyn E. Fields
Attorney, Agent, or Firm—Michael W. Sales; Wanda K. Denson-Low

[57] ABSTRACT

A thermal imaging device (10) includes a detector (50) having a linearly-arrayed plurality of spaced apart detector elements (50') upon which portions of a viewed scene are sequentially scanned by a scanner (22) in order to capture image information from the scene. A display device (22, 62, 66) similarly includes a first linear array of plural spaced apart light emitting diodes (LEDs) (62') which provide light scanned by the same scanner (22) to a user of the thermal imaging device (10) to provide an image replicating the viewed scene. The LEDs (62') of the display (22, 62, 66) are configured so that sequential portions of the image are interlaced and partially overlapped by the scanner (22) to provide a flat visual field which is free of raster lines. The display device (22, 62, 66) includes a second linearly-arrayed plurality of symbology LEDs (198) which are configured and positioned relative to the first plurality of LEDs (62') so that light from these LEDs is interlaced but not overlapped and so that symbology imagery presented by the second plurality of LEDs (198) is superimposed on the scene image presented to the user of the thermal imaging device (10).

20 Claims, 8 Drawing Sheets

FACET FIELD

| | | | | |
|---|---|---|---|---|
| 1 | 32a | 32b (R) | 32c | 32d |
| 2 | 32e | 32f (+) | 32g | 32h |
| 3 | 32i | 32j (−) | 32k | 32l |

| | Frame 1 → | | | | Frame 2 → | | | | Frame 3 → | | | |
|---|---|---|---|---|---|---|---|---|---|---|---|---|
| | a | $b^{(R)}$ | c | d | e | $f^{(+)}$ | g | h | i | $j^{(-)}$ | k | l |
| | | | | | | (D₁) | | | | | | |
| 1 | $\overrightarrow{D_1}$ | | | | $D_1$ | | | | $D_1$ | | | |
| 2 | | (D₁) | | | | (D₂) | | | | (0) | | |
| 3 | | | $D_1$ | | | | $D_1$ | | | | $D_1$ | |
| 4 | | | | $D_1$ | | | | $D_1$ | | | | $D_1$ |
| 5 | $D_2$ | | | | $D_2$ | | | | $D_2$ | | | |
| 6 | | (D₂) | | | | (D₃) | | | | (D₁) | | |
| 7 | | | $D_2$ | | | | $D_2$ | | | | $D_1$ | |
| 8 | | | | $D_2$ | | | | $D_2$ | | | | $D_1$ |
| 9 | $D_3$ | | | | $D_3$ | | | | $D_3$ | | | |
| 10 | | (D₃) | | | | (D₄) | | | | (D₂) | | |
| 153 | $D_{39}$ | | | | $D_{39}$ | | | | $D_{39}$ | | | |
| 154 | | (D₃₉) | | | | (D₄₀) | | | | (D₃₈) | | |
| 155 | | | $D_{39}$ | | | | $D_{39}$ | | | | $D_{39}$ | |
| 156 | | | | $D_{39}$ | | | | $D_{39}$ | | | | $D_{39}$ |
| 157 | $D_{40}$ | | | | $D_{40}$ | | | | $D_{40}$ | | | |
| 158 | | (D₄₀) | | | | (0) | | | | (D₃₉) | | |
| 159 | | | $D_{40}$ | | | | $D_{40}$ | | | | $D_{40}$ | |
| 160 | | | | $D_{40}$ | | | | $D_{40}$ | | | | $D_{40}$ |
| | | | | | | | | | | (D₄₀) | | |

THERMAL IMAGING DEVICE WITH SCANNED LIGHT EMITTING DIODES (LEDS) HAVING VARIABLE WIDTH GEOMETRY AND INTERLACING

This invention was made with government support under Contract No. DAAB07-91-C-K254 awarded by the Department of Army. The Government has certain rights in this invention.

BACKGROUND OF THE INVENTION

1. Field of the Invention

The present invention is in the field of imaging devices. More particularly, the present invention relates to devices for receiving invisible infrared light from a scene, and for providing a visible-light image replicating the scene.

2. Related Technology

Night vision devices have been available for many years. One category of these conventional night vision devices uses image intensifier technology. This technology is effected using a device generally known as an image intensifier tube. The image intensifier tube is essentially a frequency-shifting and amplifying device receiving ambient light, which light may include visible light too dim to provide natural vision (i.e., so-called "Star Light" scopes), or invisible near-infrared light, in a first frequency band and responsively providing a greatly intensified visible image in a phosphorescent monochrome yellow-green light.

Such an image intensifier night vision device converts available low-intensity ambient light to a visible image which a human user of the device may use for surveillance or weapon aiming, for example, under lighting conditions of too dim to allow a scene to be viewed with the natural vision. These image intensifier night vision devices require some residual light, such as moon or star light, in which to operate. This light is generally rich in near-infrared radiation, which is invisible to the human eye. The present generation of night vision scopes use a photoelectrically responsive "window", referred to as a photocathode, which is responsive to the dim or invisible ambient light focused on this "window" from an invisible scene to provide a pattern of photo-electrons flowing as a space charge moving under the influence of an applied electrostatic field, and replicating the scene being viewed. This pattern of photo-electrons is provided to a microchannel plate, which amplifies the electron pattern to a much higher level. To accomplish this amplification at the microchannel plate, the pattern of photo-electrons is introduced into a multitude of small channels (or microchannels) which open onto the opposite surfaces of the plate. By the secondary emission of electrons from the interior surfaces of these channels a shower of electrons in a pattern corresponding to the low-level image is produced. The shower of electrons, at an intensity much above that produced by the photocathode, is then directed onto a phosphorescent screen, again by the application of an electrostatic field. The phosphors of the screen produce an image in visible light which replicates the low-level image.

Image intensifier tubes have evolved from the so-called "Generation I" tubes through the more recent "Generation III" tubes, which provide greater amplification of available light and greater sensitivity to infrared light somewhat deeper into the infrared portion of the spectrum. However, these image intensifier devices are limited with respect to the depth into the infrared portion of the spectrum to which they can operate.

Another category of conventional night vision device is represented by the cryogenically cooled focal plane array thermal imaging devices. These devices use a photoelectrically responsive detector which is cooled to a temperature in the cryogenic range to reduce unwanted thermal noise. The detector includes a plurality of detector elements, or "pixels", each of which provides an electrical signal indicative of the flux of infrared light falling on the detector element. Some such devices use a staring focal plane array; while others have a linear focal plane array of detector elements, and require the use of a scanner to sequentially move portions of the viewed scene across the detector. In either case, because the detector is cooled to cryogenic temperatures, it can proved an electrical response to invisible infrared light much deeper into the infrared part of the spectrum than is possible with the image intensifier devices. The electrical signal provided by such a detector must be processed and converted to a visible image. For this purpose, many such devices of this category have used cathode ray tubes, liquid crystal displays, and other such display technologies to provide a visible image to the user of the device.

A significant disadvantage of this category of night vision device is the requirement for cryogenic cooling of the detector. Early devices of this category used a Dewar vessel into which a supply of a cryogenic fluid (such a liquid nitrogen) had to be provided by the user of the device. The utility of such devices was severely limited by their requirement for occasional replenishment of the cryogenic coolant. Later devices of this type have used cryogenic cooling developed by reverse Sterling-cycle coolers. However, such coolers require a considerable amount of power, are not without their own maintenance and reliability problems, and are generally noisy.

A device of this category is known in accord with U.S. Pat. No. 4,873,442, issued 10 Oct. 1989 to Robert W. Klatt (hereinafter, the '442 patent). The device of the '442 patent uses a sensor with a linear array of elemental detectors each spaced apart from the next-adjacent detector element by a distance about equal to the size of the detector elements themselves along the length of the linear array. Accordingly, the sensor could capture about half of the image information from a scene or object space with each field, or scan of the sensor across the object space. However, in order to detect and compensate for non-uniformity in responsivity of the detector elements, the '442 patent teaches to overlap the scan lines of all of the detector elements in successive scan fields so that each field is missing image information from at least one detector element. That is, no field of the '442 patent uses all of the detector elements to respond to signal (image information) from the scene. At least one detector element at one end of the linear array scans a space outside of the object space and provides no useful image information. According to the example set forth in the '442 patent, each field is missing a fractional part of its maximum possible image information which fraction is equal to $1/n$, where n is the number of detector elements. The remaining n−1 detector elements are used to capture half of the image information from the object space for each field. Each field thus presents 90 percent of the image information that it could contain were all detector elements used. Accordingly, each frame of two fields of the '442 patent presents a complete object space image, but represents only 90 percent of the image information which it could provide were all of the detector elements used in each frame. Additionally, the possible number of lines of resolution which the sensor can provide is not fully used by the '442 patent.

The '442 patent does not disclose the device or method used to display an visible image for the user of the device.

However, conventional devices in the thermal imaging art have used such display expedients as cathode ray tubes, which are relatively large, fragile, heavy, and power-hungry devices. In an attempt to reduce these negative aspects of the display portion of the device, some conventional thermal imaging devices have used a linear array of square or rectangular light emitting diodes, the light from which is scanned to the viewer by a mirror system similar to what the '332 patent teaches for scanning the image space to the infrared detector. These conventional display devices, which have used rectangular or square LEDs, might be considered as scanned-LED type of devices.

A disadvantage of these conventional scanned-LED display devices is that the imagery provided to the user is replete with one or more of flickering, horizontal or vertical scanning lines (i.e., visible raster lines in the display imagery), or other visible artifacts of the operation of the display device itself. These display device problems generally include visually distinguishable features which are not part of the scene being viewed (i.e., persistent or spurious vertical or horizontal lines not present in the scene; a persistent horizontal line of which could easily be mistaken for the horizon, for example), and which can decrease the performance of the imaging device and are distracting to the user of the device. Because the performance of a thermal imaging device is affected strongly by the quality of the display device presenting the imagery to the user, many conventional devices have been compromised in their performance because of the limitations of the conventional scanned-LED displays. That is, the range performance of the device may be decreased. Also, a standard test of thermal imaging devices is set forth in the U.S. Army's FLIR-90 standard for thermal imaging devices.

The FLIR-90 standard uses as a thermal resolution test for a thermal imaging device a group of four parallel bars, each with a four-to-one length to width ratio, and each spaced by its own width away from the next bar of the group. This group of bars is heated to a temperature above ambient background, and may be oriented with their length horizontal, vertical or on a diagonal. The minimum temperature difference of the bars above ambient background temperature which allows the bars to be distinguished from the background is referred to as the minimum resolvable temperature (MRT) for a thermal imaging device. A low MRT is a desirable indicator of performance for a thermal imaging device. Understandably, a poor display device will undesirably increase the MRT of a thermal imaging device.

Another conventional display expedient has been to use mechanical reticles or reticle injectors to provide a reticle or other display symbology to the user of such a device. This approach is mechanically complex, expensive and heavy. Also this expedient limits the number of possible symbology displays which can be presented to the suer of such a device. At the most, two such symbology displays are available for a user of a conventional device.

SUMMARY OF THE INVENTION

Another indication of the performance of a scanned-LED display is its flatness of visual field. This means that the raster pattern of the display blends together so that it is not discernable to the eye. Additionally, the spurious response of the display must not be too high, or else an aliased signal produced by the raster sampling process will become visible. Thus, the modulation transfer function of the display must not be too high. Further, the display must maximize the range performance of the thermal imaging device, which means that the modulation transfer function of the display must not be so low that it degrades the overall performance of the imaging device. Moreover, it is clear that the MRT of the imaging device is affected by the MTF of the display device, and that the MTF must be as high as is practicable without causing false visual artifacts in the visual field. One method of analyzing the modulation transfer function (MTF) of a scanned LED display is to taking the Fourier transform of the spatial distribution of the LEDs. The profiles of the LEDs in Cartesian coordinates are considered, and compared for various geometries of the LEDs.

In view of the deficiencies of the conventional technology, a primary object for this invention is to overcome one or more of these deficiencies.

Another object for the present invention is to provide a thermal imaging device having a scanned LED display which provides a flat visual field, and a desirably high modulation transfer function enhancing the overall performance of the thermal imaging device, without causing spurious visual artifacts in the visual field of the display device.

According to one aspect, the present invention provides a light emitting diode (LED) display apparatus including a linear array of plural spaced apart like scene light emitting diodes (LEDs) defining like spaces between adjacent scene-LEDs, and a scanner scanning light emitted from the scene-LEDs to a viewer with rapid interlacing of light from successive scans so as to fill in the spaces between adjacent scene-LEDs of the array and to provide an image, the scene-LEDs having a geometric configuration varying in width along a length dimension of the linear array.

Another aspect of the present invention provides a thermal imaging device responsive to invisible thermal infrared radiation from a viewed scene to responsively provide a visible image replicating the scene, the thermal imaging device including a detector array responsive to the thermal infrared radiation and including a linearly-arrayed plurality of spaced-apart detector elements defining cooperatively a length dimension for the detector array, a scanning device scanning the viewed scene across the plurality of detector elements in a direction generally perpendicular to the length dimension, the scanning device on successive scans interlacing portions of the viewed scene as scanned across the plurality of detector elements according to the spacing therebetween to capture image information from all of the scene, each of the plurality of detector elements providing a corresponding individual electrical signal indicative of the thermal infrared radiation incident thereon, and a display apparatus responsively providing a visible-light image replicating the viewed scene, the thermal imaging device including the display apparatus having a linear array of plural spaced apart like scene light emitting diodes (LEDs) defining like spaces between adjacent scene-LEDs, and a scanner scanning light emitted from the scene-LEDs to a viewer with rapid interlacing of light from successive scans so as to fill in the spaces between adjacent scene-LEDs of the array and to provide an image, the scene-LEDs having a geometric configuration varying in width along a length dimension of the linear array.

These and additional objects and advantages of the present invention will be appreciated from a reading of the following detailed description of at least one preferred exemplary embodiment of the invention, taken in conjunction with the appended drawing Figures, in which the same reference numeral indicates the same feature, or features which are analogous in structure or function to one another.

DETAILED DESCRIPTION OF AN EXEMPLARY PREFERRED EMBODIMENT OF THE INVENTION

An Overview

Figure 1:
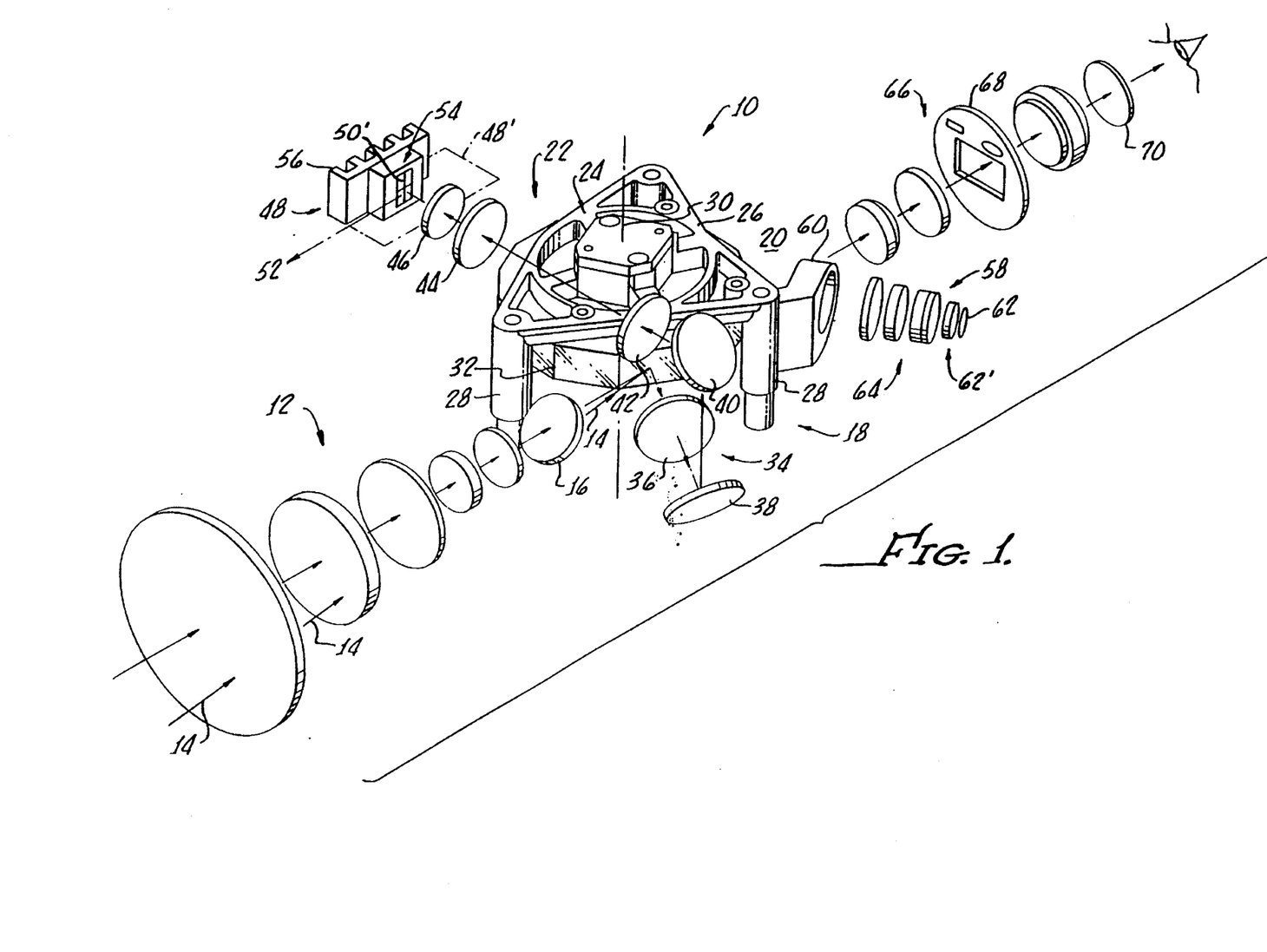
FIG. 1 provides a diagrammatic representation of the functionally cooperating physical components of a thermal imaging device embodying the invention.

Viewing FIG. 1, a thermal imaging device 10 is diagrammatically depicted with its functionally cooperative physical components suspended in space without the depiction of a supporting housing (which housing is, of course, included by a physical embodiment of the device), so that these components and a ray-tracing diagram for light rays in the device can also be presented. Viewing FIG. 1 in detail, the thermal imaging device includes an objective optics group, generally indicated with the numeral 12. This objective optics group includes several lenses (multiple as shown), which lenses are transparent to light in the spectral band of interest (but not necessarily transparent to visible light). The objective optics group 12 is pointed toward a scene to be viewed, so that infrared light from this scene (indicated with the arrowed numeral 14) can be received and focused by this optics group. It will be understood that the objective optics group 12 seen in FIG. 1 is representative only, and that this optics group may be removed and replaced with objective optics of differing configurations, as will be further described. The objective optics group 12 concentrates and collimates received light through a window 16, which window is a permanent part of a basic sensor portion 18 of the device 10. In conjunction with the housing (to be described below) of this basic sensor portion 18, this window 16 bounds a sealed chamber 20 in which are received almost all of the remaining components of the device 10 as illustrated in FIG. 1.

Within the housing chamber 20 is received a scanner, generally referenced with the numeral 22. This scanner 22 includes a scanner frame 24, which is generally of triangular or tripod configuration in plan view. The scanner frame 24 includes a generally triangular upper wall portion 26, and three depending leg portions 28, only two of which are visible in FIG. 1. Carried by the wall portion 26 is a scanner motor, generally indicated with the numeral 30. This scanner motor 30 includes a generally vertically extending rotational drive shaft (not visible in the drawing Figures) drivingly carrying a disk-like circular multi-faceted scanning mirror 32. The scanning mirror 32 includes plural outwardly and circumferentially disposed adjacent facets (multiple as shown) only a few facets of which are seen in any one of the drawing Figures. This scanning mirror 32 rotates in a generally horizontal plane to reflect light 14 received via the window 16 and objective optics group 12 to an image optics group, generally indicated with the numeral 34. It will be noted that because of rotation of the scanning mirror 32, the facets (multiple as shown), continually change their angulation in the horizontal plane with respect to the scene viewed via the objective optics group 12.

Considering the image optics group 34 in greater detail, it is seen that light (arrow 14) reflected from a facet of the scanning mirror 32 passes through a lens 36 and to a pair of vertically spaced angulated mirrors 38, and 40. The mirror 40 reflects this light through an additional pair of lenses 42, and 44 toward a window 46 carried by a Dewar vessel 48. The Dewar vessel 48 includes a thermally insulative housing, generally indicated with the dashed line and the reference numeral 48'. This Dewar vessel 48 houses a linear focal plane infrared detector 50 having a linearly-arrayed multitude of small infrared detector elements, indicated collectively on FIG. 1 with the vertical line 50' on detector 50. Each of the detector elements 50' of the detector 50 provides a corresponding one of a like multitude of electrical signals each of which is indicative of the flux level of infrared light falling on the particular detector element. These electrical signals are provided outwardly of the Dewar vessel 48 by an electrical interface (to be further described), and indicated on FIG. 1 with the dashed line 52.

In order to cool the detector 50 to a sufficiently low temperature that thermally excited electrons (as opposed to electrons excited by photons of infrared light falling on the detector 50) do not cause an undesirably high level of electrical noise which would hide the desired photoelectric image signal, the Dewar vessel 48 includes a multi-stage reversed Peltier-effect (i.e., thermoelectric) cooler 54. The thermoelectric cooler 54 has a chilling face to which the detector 50 is mounted to be cooled, and a heating face in heat transfer relationship with a heat sink schematically indicated with the numeral 56. In the physical embodiment of the imaging device 10, the heat sink 56 is defined by a metallic portion of the housing for the device 10 as will be seen. It will be understood that because of the continuous change in angulation of each facet (multiple as shown), of the scanning mirror 32 as this mirror rotates in a horizontal plane, the scene reflected from each particular facet sweeps horizontally across the linear array of detector elements 50' (i.e., perpendicularly to the vertical linear array of these detector elements). The detector elements 50' responsively provide electrical signals (via interface 52) which are indicative of the flux levels of infrared light falling on corresponding ones of the plural detector elements 50' from a particular part of the scene during any one sweep of a scene portion across the detector 50.

In order to provide a visible image to be viewed by a user of the imaging device 10, a light emitting diode (LED) projection array module 58 is carried by an apertured flange portion 60 of the scanner frame 26. This LED projection array module 58 includes a linear LED array 62, which array includes a multitude of individual LEDs (not visible in FIG. 1, but indicated with the arrowed numeral 62'), each individually emitting visible light when energized. The LEDs 62' of the array 62 are arrayed linearly along a vertical line similarly to the linear arrangement of the detector elements 50' of the detector 50. The LEDs 62' provide respective portions of a visible image, as will become apparent. Light from the LEDs 62' is collimated and projected by a projection lens group, generally indicated with the numeral 64, onto a facet of the mirror 32. The numeral 14 is used intentionally with respect to the invisible infrared light carrying image information from a scene, and the visible light replicating the scene for viewing by a user of the device 10.

From the mirror 32 (i.e., from a particular facet 32' of this mirror) the visible light from the LEDs 62' is reflected to an ocular lens group, generally indicated with the numeral 66. The ocular lens group 66 includes several individual lenses, (multiple as shown). Along with these lenses of ocular lens group 66, a status display unit 68 is interposed in the ocular lens group 66. This status display unit 68 defines an aperture through which the visible image is perceived, and includes several individual LEDs which when illuminating are peripherally visible to the user of the device 10. These individual LEDs are not shown. Finally, the imaging device 10 includes a pair of eyepiece shutters 70. These shutters 70 are biased closed to prevent light emanations from the device 10 when a user's face is not pressed against a movable eyepiece member (to be described below). When the user presses against the movable eyepiece member, the shutters 70 open to allow the user to view the visible light image provided by the LED projection display module and the spinning mirror 32.

Figure 2:
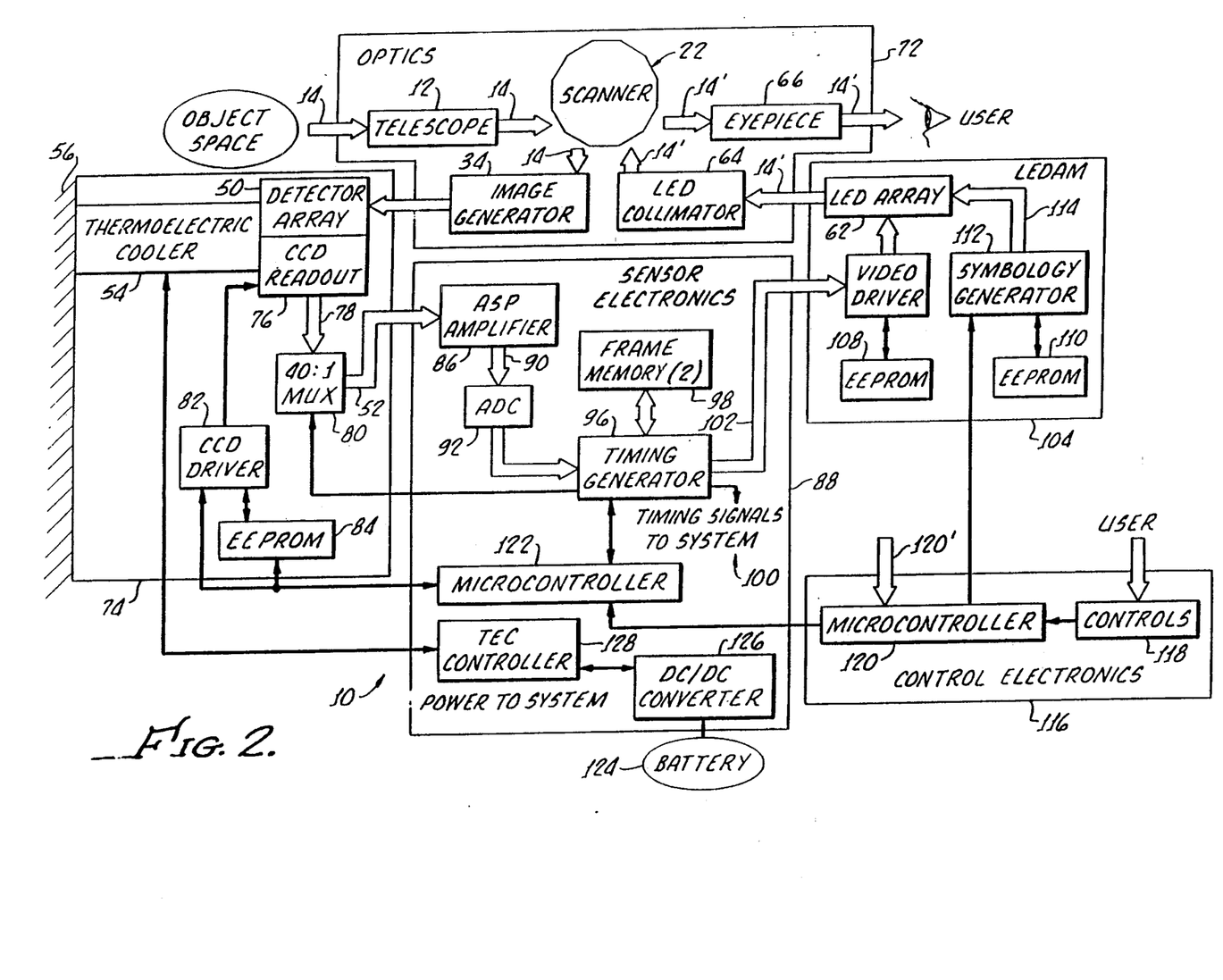
FIG. 2 is a schematic block diagram of a thermal imaging device according to the present invention.

Viewing now FIG. 2, a schematic functional block diagram of the thermal imaging device 10 is presented. This thermal image device 10 is divided into functionally modular portions, as is indicated by the dashed-line boxes encircling the various components of the device, with some of the modules including several sub-modules or components. The module 72 manages both invisible and visible light, and includes the objective optics group 12 receiving the invisible infrared light 14 from a scene to be viewed, the scanner 22, and image optics group 34 directing this invisible light to the detector 50. This light management module 72 also receives visible light from the LED array 62, and includes the projection lens group 64 projecting this light to the scanner 22, and ocular lens group 66 providing the image to a user of the device.

Detection module 74 is enclosed within the Dewar vessel 48, and receives the focused invisible infrared light 14 from the scene to be viewed. This module 74 includes the detector 50, along with a readout circuit 76 providing multiple channels of electrical image signal 78 (one channel for each detector element of the linear detector array 50, recalling the description above) to a multiplexer circuit (MUX) 80. The MUX 80 provides the electrical interface output 52 in the form of a serial analog image signal. Detector module 74 also includes a driver circuit 82 providing control commands to the readout circuit 76. An electrically erasable programmable read-only memory (EEPROM) 84 is included in the detection module 74 to locally store and provide data on the operation of the readout circuit 76, providing compensation factors locally for a number of gain-control and non-uniformity compensations in connection with the infrared detector 50. As can be seen from FIG. 2, the various circuits of the module 74 have electrical interface with other modules of the device 10.

The serial analog image signals 52 provided by module 74 are received by an analog signal processor (ASP) 86 which is located in a process-and-control (P&C) module 88. A processed serial analog image signal 90 is provided by the ASP 86 to a analog-to-digital converter (ADC) 92. A resulting processed serial digital image signal 94 is provided to a timing generator 96. This timing generator 96 has an interface with the multiplexer circuit 80 to control the timing of operation of this circuit. A frame memory 98 is interfaced with the timing generator so that image information which is global to the scene being viewed may be stored and retrieved for use in providing gain adjustment, contrast, and other compensation factors for use in processing the image signals obtained from the detection module 74. Timing generator 96 also provides a system-wide timing control signal, indicated with the reference numeral 100. This timing control signal is used to operate several other features of the imaging device 10, including control of the rotational speed and position of the mirror 32 so as to achieve time-correlation of the operation of the detector 50, mirror 32, and LED array 62.

A serial digital image signal 102, compensated and time-correlated, is provided by the timing generator 96 to a display module 104. This display module 104 includes the LED projection array module 58, along with a driver circuit 106 for receiving the signal 102 and driving the individual LEDs 62' in response to this signal. An electrically erasable programmable read-only memory (EEPROM) 108 has an interface with the driver circuit 106 for receiving and storing for future use values to be used in the operation of the device 10. For example, EPROM 108 may be used to store stadia line spacing information, which would allow the device 10 to be used to estimate ranges to personnel or vehicles of known sizes. In order to provide a user of the imaging device 10 with additional useful image information, such as spaced apart comparative-size lines for humans and various types of vehicles so that ranges can be estimated, or with a reticle of various kinds and sizes in accord with the range to an object being viewed and the use being made of the device 10 at a particular time, the display module 102 also includes another electrically erasable programmable read-only memory (EEPROM) 110 for storing such image information. This image information, as selected by the user of the device 10, is provided to a symbology generator circuit 112, which in turn provides a symbology signal 114 to the LED array 62. The array 62 includes separate light emitting diodes (LEDs) for receiving the signal 114.

In order to complete this description of the imaging device 10 as illustrated in FIG. 2, it should be noted that the device 10 includes an input-output (I/O) module 116. This I/O module 116 allows a user of the device 10 to input commands via a set of externally-accessible controls 118, such as a set of momentary contact push button switches which may be operated from outside the housing of the device 10. The controls 118 have an interface with a microprocessor 120, which is part of a distributed control system also including another microprocessor 122 in the P&C module 88. The microprocessors 120 and 122 have an interface with the EEPROMs 84, 108 and 110, along with the circuits served by the data and commands stored in these EEPROMs. The microprocessor 120 has an externally-accessible data interface port 120' so that all of the data and programming stored in the microprocessors 120, 122, and the EEPROMs interfaced with these microprocessors, and the circuits served, may be inserted and changed by access to the port 120'. Finally, it is seen that the P&C module 88 provides power input to the system from a power source, such as from a battery pack 124. A DC/DC power converter 126 provides power to various modules and components of the device 10 at appropriate voltage and current levels. One of the circuits powered from converter 126 is a controller 128 for the thermoelectric cooler 54.

Figures 3A, 3B:
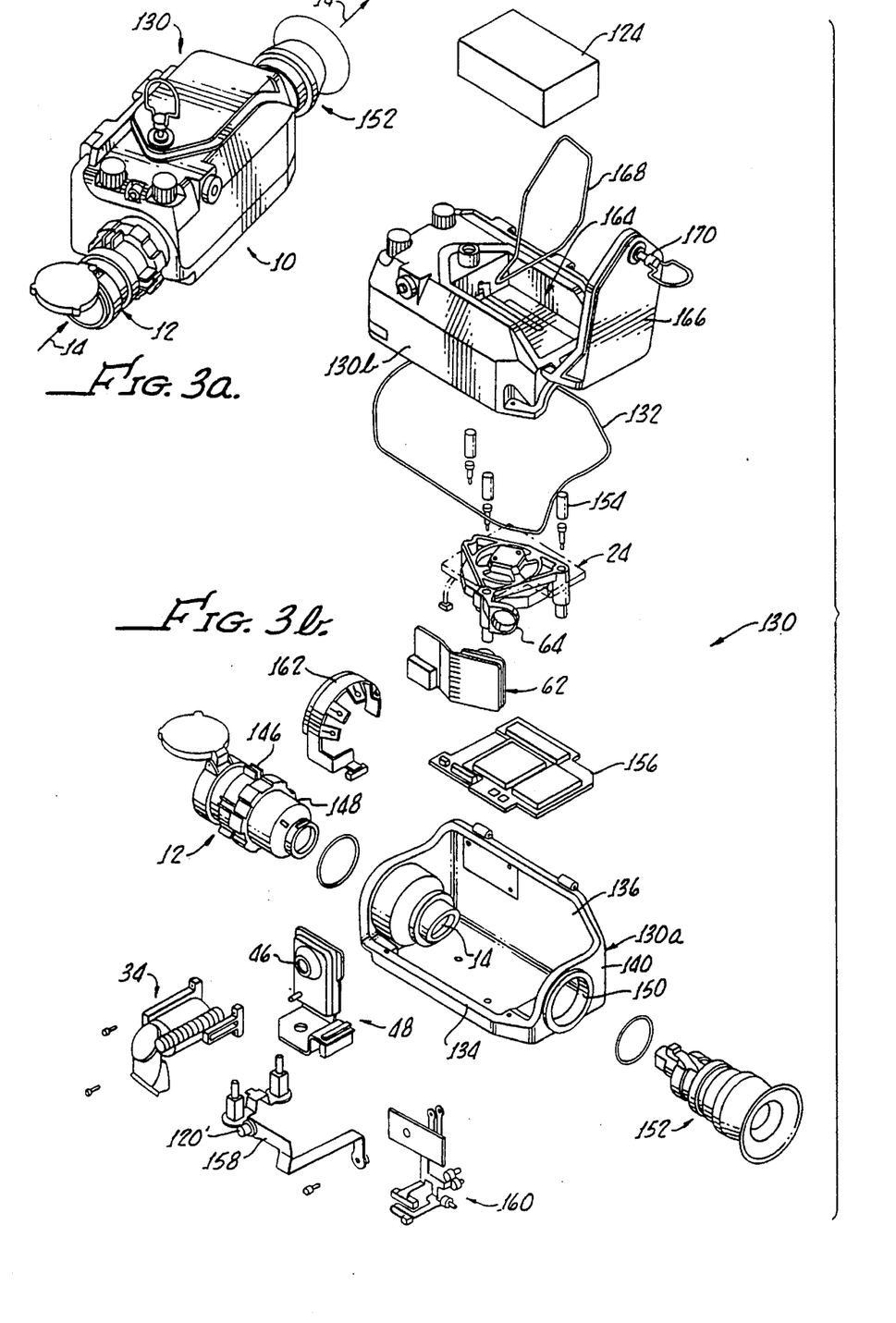
FIGS. 3a and 3b respectively provide an external view and an exploded perspective view of a thermal imaging device embodying the invention.

Turning now to FIGS. 3a and 3b, a physical embodiment of the imaging device 10 is presented in external view and in exploded perspective view, respectively. The imaging device 10 includes a two-piece chambered housing 130. This housing includes two pieces 130a and 130b which sealingly cooperate (via an intervening sealing member 132) to bound the chamber 20 within this housing. The part 130a of the housing 130 is fabricated of cast non-magnetic metal (of aluminum, for example), is somewhat L-shaped in transverse cross section, and provides a lower wall portion 134, a side wall portion 136, and an apertured pair of opposite front (138), and rear (140) wall portions. This housing part 130a provides a heat sink for the thermoelectric cooler 54, and a base (i.e., in effect, an optical bench) to which the optical and other components of the device 10 are mounted, as will be seen.

The front wall portion 138 of housing part 130a defines a reentrant portion 142 which forwardly defines a somewhat conical recess (not visible in the drawing Figures), and which at its aft end carries the window 16 in the aperture 144 of this wall. The objective optics group 12 is carried at this front wall 138 by a housing 146 which at its aft end defines a conical portion 148 for receipt into the front recess of the housing part 130a. The housing 146 is removably engageable with the housing part 130 to connect the objective optics group 12 in its proper location, and is also removable so that optics of different power may be fitted to the sensor portion 18. At the aperture 150 of the rear wall portion 140, the ocular lens group 66 is sealingly carried in a housing portion 152.

Within the chamber 20 of the housing 130, the scanner 24 is secured to the lower wall 134 by a trio of screws 154 which each pass through a respective vertically extending hole defined centrally of a corresponding one of the three legs 28 of the scanner frame 24. These screws threadably engage respective bores defined by the lower wall 134. Captured between the lower ends of the legs of the scanner frame 24 and the lower wall 134 of the housing 130 is an electronics assembly 156. This electronics assembly 156 includes a circuit board and many of the discreet and integrated circuit devices including micro-controller 122, which are necessary in order to effect the functions explained with respect to FIGS. 1 and 2. Also mounted to the lower housing part 130a, in addition to the already identified components and modules, which are indicated on FIG. 3b with their previously-introduced reference numerals, is an electronic cable assembly 158. This cable carries externally-accessible data interface port 120', the connector for which extends sealingly through a hole provided in the housing portion 130b, as is seen in this drawing Figure.

A Control electronics module 160 with its own cable assembly also mounts in the housing 130 and provides the control input momentary-contact switches 118 and micro-controller 120 identified with respect to FIG. 2. Finally, received in the housing 130 and circumscribing the reentrant portion 142 of the front wall 138 is a magnetic reed switch and cable assembly 162. This cable assembly with its several magnetically-responsive reed switches is responsive to one or more magnets carried in respective locations by various ones of the objective optics groups which can be used with the basic sensor 18. These magnets are located in particular locations (i.e., in a position code) on each objective lens set in order to provide a user both with differing levels of magnification of a distant scene, and differing symbology appropriate for the particular use for which the objective lens set adapts the sensor 18. When the basic sensor responds to the installation of a particular lens group, the user is provided with symbology and other internal adjustments of the operation of the sensor 18 automatically. The reed switches are able to sense the particular locations of the magnets on the lens groups (thus identifying the particular lens group) through the non-magnetic front wall portion 138 of the housing 130. Thus, no physical input is necessary from an operator to identify a particular lens group to the sensor 18, and the chamber 20 remains sealed.

Viewing now the housing portion 130b, it is seen that this housing portion defines a battery compartment recess 164 at an aft portion of the housing 130. This recess opens both upwardly and rearwardly on the housing part 130b. Battery 124 is received into the recess 164, and is covered sealingly in this recess by a hinged door member 166 with an intervening sealing member 168. The door 166 is somewhat L-shaped in side view, and is hinged adjacent to its rear edge to the housing part 130b. A latching device 170 is carried by the door 166 adjacent to its forward end, and is removably engageable with a recess feature of this housing part to retain the door 166 in its closed position, as is seen in FIG. 3a.

Detector Element Non-Uniformity Correction And Global Image-Level Control

Figure 4:
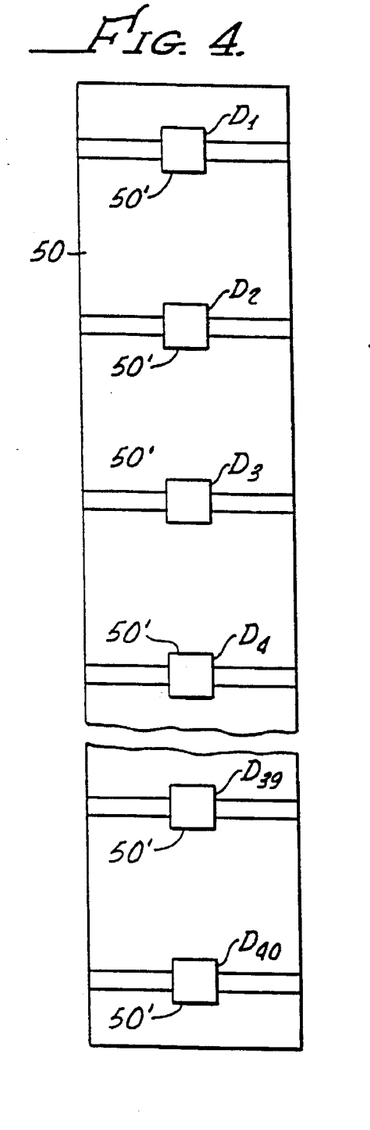
FIG. 4 presents a schematic view of a linear array sensor utilized in an embodiment of the invention described herein.

Turning now to FIG. 4, it is seen that the detector 50 includes a semiconductor substrate 172, upon which the detector elements 50' are defined. These detector elements 50' are of finite size (i.e., about 50 microns or 0.002 inches square), and are depicted as being rectangular with equal edge dimensions (i.e., square), although other geometric configurations for the detectors 50' can be used with equal success within the scope of the present invention. Detector elements 50' may be defined on substrate 172 using chemical vapor deposition, or other appropriate semiconductor fabrication techniques, using an infrared responsive photoconductive material, such as mercury cadmium telluride, for example. These detector elements 50' become more conductive in response to incident infrared light flux. Consequently, each detector element 50' provides a respective electrical signal indicative of the infrared light flux (photons) incident upon the detector element during a sampling interval. For purposes of identification, the detector elements 50' are designated with a subscript n, where n varies from 1 to 40 from top to bottom of the detector 50. Detector 50 includes 40 detector elements 50', each spaced from the next-adjacent detector element by a vertical spacing equal to substantially three times the vertical edge dimension of the detectors 50'. That is, adjacent edges of the elements 50' are about 150 microns apart, or enough space to allow three additional detector elements to be inserted between adjacent detector elements with adjacent sides touching.

Figure 5A:
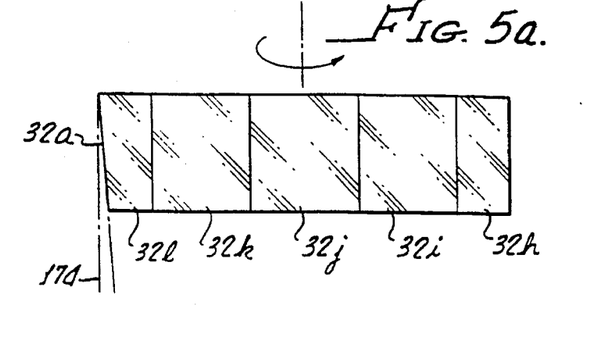
FIGS. 5a and 5b respectively present a schematic diagram of the facets of a scanning mirror of a thermal imaging device embodying the invention, and a chart of scanning mirror facet angle families, along with identification of three members of this facet angle family which have either a facet reference angle or one of a pair of a transposing facet angles.
Figure 5B:
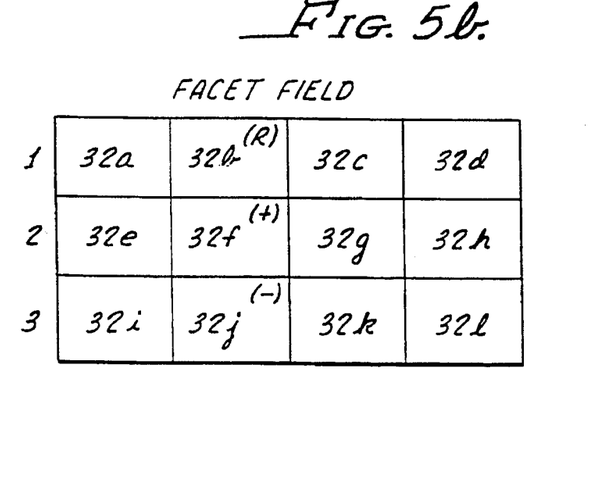

FIGS. 5a and 5b present first a schematic representation of the scanning mirror 32, with a representation at line 174 of an angulation of a facet 32a, etc., of the mirror 32 relative to the perpendicular to the rotational plane of this mirror. The angulation of the line 174 is exaggerated in FIG. 5a, so that the reader may appreciate that the associated facet of mirror 32 is angulated to reflect incident light at a selected angle to the plane of this mirror 32. Each of the facets 32a, 32b, 32c, etc., of the mirror 32 are angulated selectively in order to vertically move the reflected scene as projected onto the detector 50 one forth of the spacing distance between adjacent detector elements 50' compared to the position of the scene as reflected by adjacent facets. FIG. 5b shows that the facets 32a, 32b, 32c, etc., are arranged in families, with the members of the first family being disposed adjacent to one another sequentially around the mirror 32, and being followed next-sequentially by the second family of facets, and so on around the mirror 50. Each facet 32a, 32b, etc., as the mirror 32 rotates scans the viewed scene image across the detector 50, which detector captures one-forth of this image as an image field, and each family of facets creates one complete frame of image information, as is further described below.

Further viewing FIG. 5b, it is seen that each facet family (frame) includes a facet 32b, 32f, or 32j, which is ether a reference facet (32b), or a transposing facet (32f, or 32j). The reference facet 32b is an ordinary member of the facet family 32a–d, each facet of which displaces the reflected image portion onto the detector 50 one-fourth of the separation distance between detectors 50', compared to the adjacent facets in the family. However, the transposing facets 32f and 32j are additionally angulated respectively upwardly and downwardly to reflect the image portion on the detector 50 so that the image portion previously scanned across a detector element $50'_n$ is scanned across a detector $50'_{n+1}$, or $50'_{n-1}$, as is more fully described by reference to FIG. 6.

Figure 6:
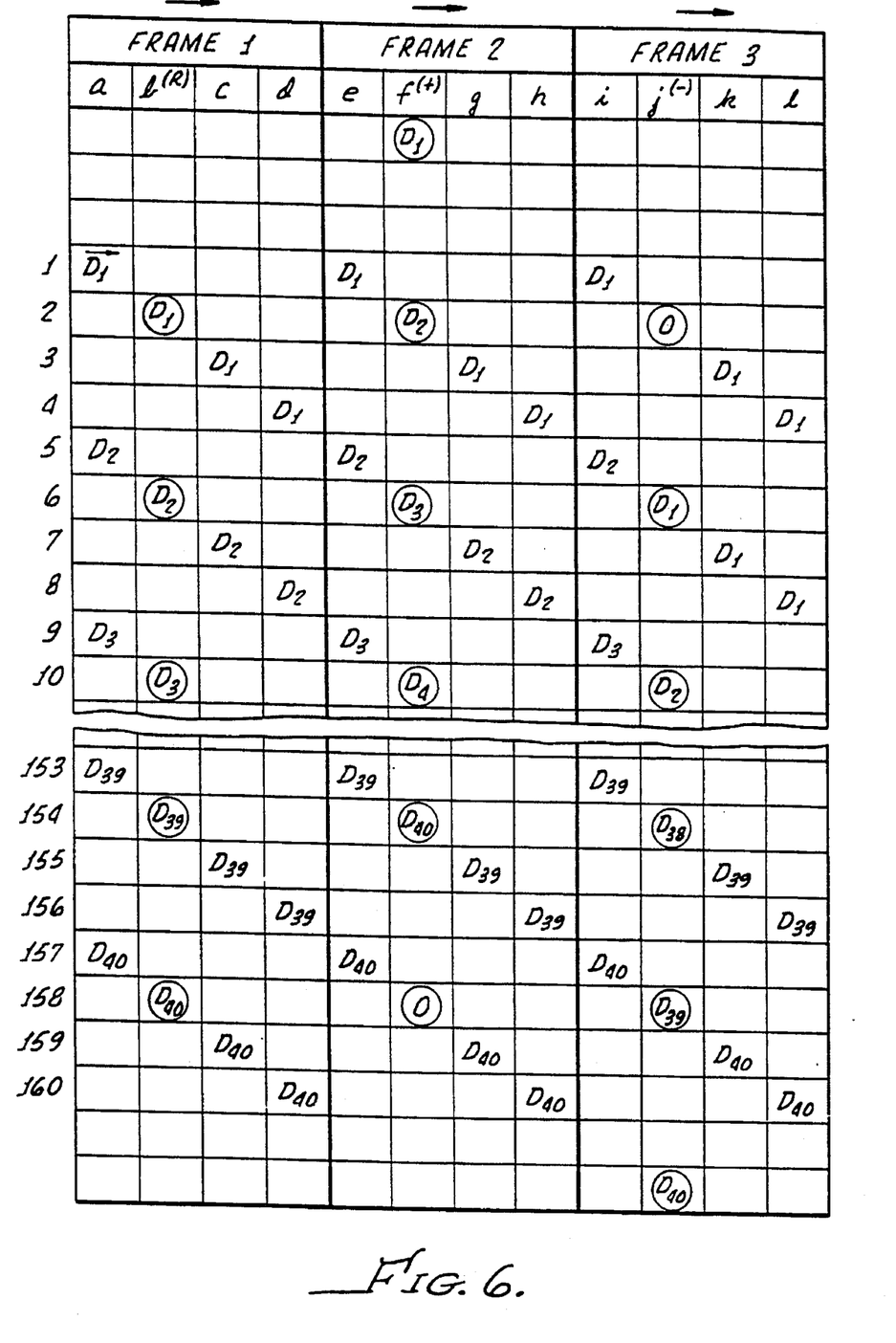
FIG. 6 is an image space sequential scan chart for three sequential frames, each having four sequential fields.

Viewing FIG. 6, a chart is presented which from top to bottom represents the scanning across an image space of 160 horizontal scanning lines (i.e., 160 lines of vertical resolution) which the present thermal imaging device achieves with only forty detectors. The vertical spacing from top to bottom of the chart of FIG. 6 is representative of the vertical distance from top to bottom of detector 50, recalling FIG. 4. The first column (for facet 32a) of FIG. 6 represents with an arrow associated with each detector element number the horizontal aspect of these scan lines extending across the viewed scene for detectors number 1 through 40 ($50'_n$–$50'_{n+39}$). Preferably, each detector element is sampled 512 times during the interval that the viewed scene is scanned across the detector elements 50' by each facet 32' of the scanning mirror 32. The next column of FIG. 6, for reference facet 32b, indicates that the next subsequent field of image from the viewed scene is reflected by facet 32b on the detectors 50' with a vertical displacement one-forth the distance between adjacent detectors 50'. Similarly, each horizontal scan line for this field includes 512 sampling intervals or pixels for each detector element 50'. The detector locations in reference field 32b are circled on FIG. 6.

The following two facets 32c and 32d similarly capture a respective one-forth of the image information from the viewed scene, and each have 512 horizontal sampling intervals for each scan line. The horizontal scan lines for the first field are interlaced so that the four fields make a complete image frame. Accordingly, it is seen that the first complete frame of four fields, captured as the four successive facets 32a–32d scan the viewed scene over the detector 50, captures the entire scene with interlacing of the scan lines from the 40 detector elements to achieve 160 lines of vertical resolution and 512 pixels of horizontal resolution.

Now viewing the next frame of FIG. 6, which is captured by facets 32e–32h as these facets reflect respective portions of the viewed scene across the detector 50, it is seen that this frame includes a transposed field corresponding to facet 32f, in which the horizontal scan lines of the viewed scene are reflected on detectors $50'_2$–$50'_{40}$, with the relative position of detector $50'_1$ being shifted upwardly outside of the field of view of the imaging device 10. That is, the reflected portion of the viewed scene is reflected by facet 32f on detector elements 50' which are transposed one detector element upwardly in comparison to the position of these scene portions in field 32b. Again, the locations of the detector elements in field 32f are circled on FIG. 6. The second frame includes all image information for the viewed scene, with the exception of the horizontal scan line in field 32f which would have been provided by detector element $50'_{40}$. Since detector element $50'_{40}$ is used to sense the scene scan line at the location of detector element $50'_{39}$, the scan line where detector $50'_{40}$ would have ordinarily been located (line 158) has a zero value. Comparing the first frame and second frame, it will be seen that the reference field (32b) and transposed field 32f have the same image information seen by detectors $50'_1$–$50'_{39}$ in the first frame as is viewed by detectors $50'_2$–$50'_{39}$ in the second frame.

Similarly, the third frame of FIG. 6 includes image fields 32i–32l, reflected onto the detector 50 by the correspondingly identified facets of mirror 32. This frame includes transposed field 32j, (with detector element locations circled on FIG. 6) which is relatively transposed downwardly by one detector element location, and has the scene portions viewed by detector elements $50'_2$–$50'_{40}$ in the reference field 32b reflected upon detector elements $50'_1$–$50'_{39}$. That is, in this case the relative position of detector element 50'40 is off the field of view of the imaging device 10, and the horizontal scan line which would otherwise be captured by detector element $50'_1$ has a zero value. Because these detector elements have viewed the same portion of the viewed scene, the signal levels from these detector elements should be the same.

Also, comparing the second frame and third frame, it will be seen that the field 32f and field 32j have the same image information seen by detectors $50'_3$–$50'_{40}$ in the second frame viewed by detectors $50'_1$–$50'_{38}$ in the third frame. Because these detector elements have viewed the same portion of the viewed scene, the signal levels from these detector elements should be the same. If the signals for these detector elements are not the same, this indicates a difference in the responsivity of the detector elements themselves. Two non-uniformity comparisons are possible for all detector elements except elements $50'_1$ and $50'_{40}$, viewing the circled locations on FIG. 6. One comparison is possible for these latter two detector elements 50'.

After the third frame, the scanning mirror 32 has completed one rotation, and the sequence described above repeats itself. Viewing the chart of FIG. 6, it is seen that frame 1 is complete with one-hundred percent of the image information which the detector elements 50' could possibly capture. Frames 2 and 3 are almost complete, with the exception of the absence of one horizontal scan line for each frame (i.e., line 158 in frame 2, and line 2 in frame 3), so that each of these frames include 159 horizontal scan lines. Overall, each sequence of three frames includes 160+159+159 scan lines for a total of 478 horizontal scan lines of image information out of a possible total of 480 such scan lines. This image capture effectiveness is equivalent to 99.6% of the possible image information which could be obtained with the 40 detectors 50'. A resolution of 160 vertical lines by 512 horizontal pixels per line is provided preferably for each frame, as was pointed out above.

Figure 7:
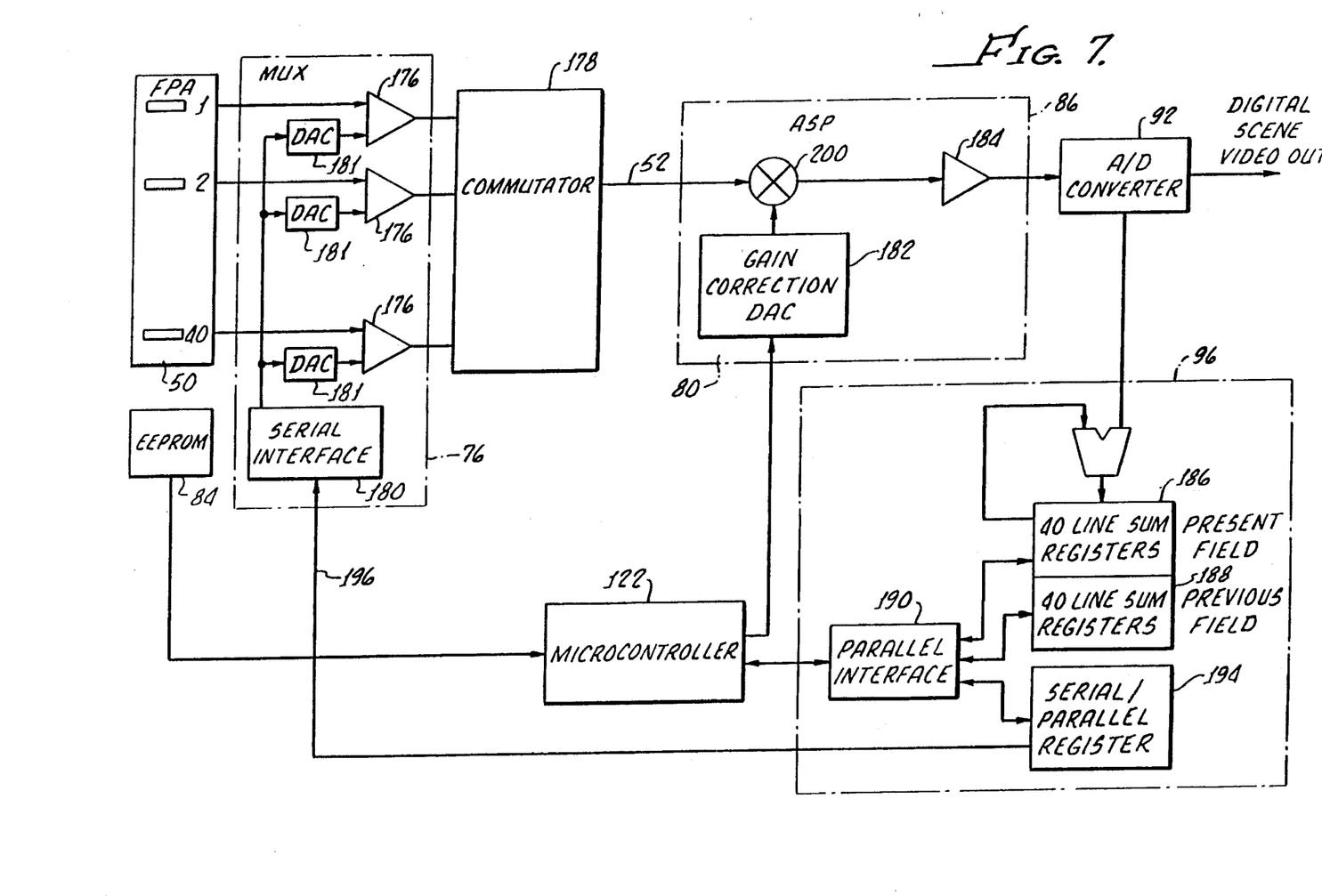
FIGS. 7 and 8 present related block diagrams depicting the signal processing circuitry and methodology used to achieve economical non-uniformity detection and compensation, as well as global scene brightness level control in a viewing apparatus according to the present invention.

Viewing now FIGS. 7 and 8 together, the signal processing circuitry architecture and methodology used to obtain detection of and compensation for non-uniformity in the photo-conductivity and responsiveness to infrared light flux of the detector elements 50', as well as a global intensity control (i.e., overall thermal infrared image brightness level) for the image captured by the thermal imaging device 10 is depicted. Viewing first FIG. 7, it is seen that each of the detector elements 50' of the detector 50 has a respective analog direct-current connection to a corresponding channel in multiplexer 80, recalling the readout circuit connection 76 generally explained with respect to FIG. 2. This connection is not AC coupled, as would be conventional. Each connection includes a respective amplifier 176 providing a respective amplified signal to a commutator circuit 178, which effects the switching of the amplified signals from the detector elements 50' and amplifiers 176 into a serial analog signal stream (recalling the signal transferred by electrical interface 52 presented in FIG. 2). Each amplifier 176 receives a respective offset signal from a serial interface circuit 180 via a respective digital-to-analog (DAC) circuit 181. As will be explained, the offset signals for each detector element 50' are selected to compensate on a dynamic basis for differences or non-uniformities in the detector elements 50'. These differences or non-uniformities are detected by comparing the response of these detector elements when they view the same horizontal scan line of field 32b, 32j, or 32j, as pointed out above, particularly recalling FIG. 6.

The resulting serial analog image signal stream is provided via interface 52 to analog signal processor 86. In this analog signal processor 86 a global gain correction for level of the video signal is applied to each analog signal in turn by a gain correction digital-to-analog converter 182. As will be seen, these gain correction signals are selected in view of a previously applied global level correction so that the resulting signals as amplified by an amplifier portion 184 of the ASP 86 are delivered to the A/D converter 92 corresponding on average to the mid-point or mid-scale level for an input signal to this converter 92, again recalling FIG. 2.

Figure 8:
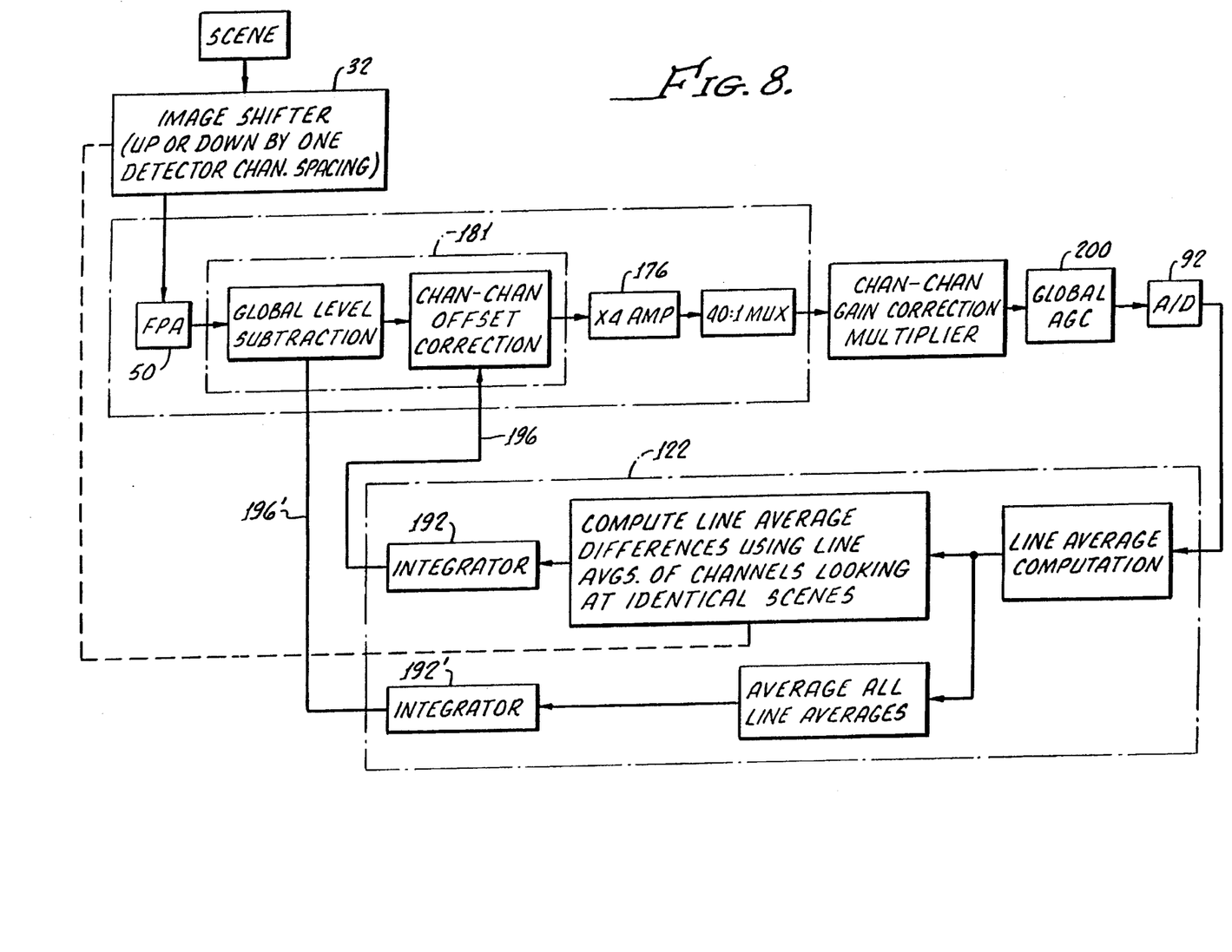

In order to achieve this signal processing, the timing generator 96 receives the digital scene video signals from A/D converter 92. For non-uniformity detection and correction, the timing generator uses a pair of 40-line registers 186, and 188. These registers are used to sequentially accumulate and hold line-sum values for the scanning lines of the reference field 32b, and for transposed fields 32f and 32j, as these fields sequentially are received by the detector 50. As each sequential field is received, the previous field values are shifted from register 186 to register 188 on a write-over basis for comparison purposes. That is, the signal levels for all 512 pixels of each scan line of these fields are added together in the registers 186, 188, and are averaged by microprocessor 122. FIG. 8 depicts graphically the signal processing methodology carried out as described above, and as is further described below. The microprocessor 122 has a parallel interface with the timing generator 96, which interface is indicated with circuit block 190, and arrowed numeral 190'. The microprocessor 122 performs the necessary scan line average computation for each field, and the necessary comparison among the scan line average values for fields 32b, 32f, and 32j on a sequential frame-by-frame basis to calculate the necessary offset signals for each detector in a dynamic attempt to drive the sequential differences between detectors looking at the same portion of the viewed scene to zero. A time integration of correction values to the offset signals is effected (see block 192 in FIG. 8) so that the offset signal values for the detector elements change at a rate allowing panning of the thermal imaging device over a scene without the scene variations so caused resulting in artifacts or spurious transients in the viewed image. The resulting offset signal levels are provided by microprocessor 122 via interface 190 to serial-parallel interface, and to serial-parallel interface 180 by the connection indicated with arrow 196.

Additionally, the same A/D converters 181 which are used to provide the offset values to the amplifiers 176 are also used to receive and apply a global level control signal by superposition with the non-uniformity correction offset signal. That is, FIG. 8 shows that the effect of the detector-to-detector non-uniformity correction offset signals and of a global level correction or control signal are applied to the amplifiers 176 by summation of these signals. The global level offset signal is applied in common to all 40 of the DACs 181, and is provided by microprocessor 122. This global correction signal or offset signal is equivalent to the thermal "plateau" upon which the image information from the scene exists. The height of this thermal plateau is variable dependent upon the average background temperature of the scene viewed with the device 10. This average thermal background signal level is subtracted out of the signals from the detectors 50' so that the thermal image information in these signals is more easily accessed. Moreover, microprocessor 122 computes the average of all 40 line averages calculated above, and provides the global level offset signal to the DACs via interface 190 for superposition with the individual non-uniformity correction offset signals so that the average of all line averages satisfies a selected criteria.

As pointed out above, the selected criteria is that the signal provided by amplifier 184 to A/D converter 92 is on average to be at the mid-scale level for an input signal to this converter 92. This signal is indicated with the arrowed numeral 196' in FIG. 8. It will be noted that this global level calculation and offset signal provision has the effect of using the viewed scene as a thermal reference source for the thermal imaging device 10. No thermal reference source other than the viewed scene itself is required, which considerably saves on power consumption, complexity, size, and weight for the device 10. Also, the device 10 automatically adjusts for the various temperatures of viewed scenes so that the signal level to the converter 92 is maintained in a selected range. As a result, no adjustment of the device 10 is necessary when a user of the device changes from looking at a relative cool scene, for example a scene viewed on the ocean, to a warmer scene, such as a forest after sundown on a warm day. The device 10 internally adjusts the global level offset signal so that the user sees an image neither too bright or too dim, but one having a uniform brightness.

The Scanned LED Display Module

Figure 9:
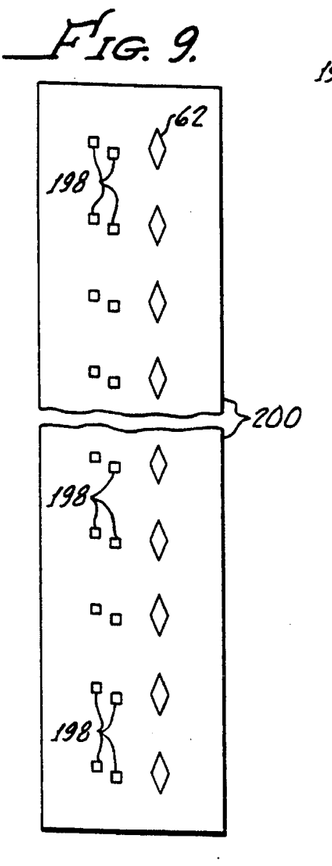
FIG. 9 provides a schematic diagram of an LED display structure.

Viewing FIG. 9, the LED array 62, which is located in LED projection array module 58 as was explained above, is schematically depicted at a greatly increased size. This array 62 includes a vertically arrayed plurality of LEDs 62', which are used to present to the user of the device 10 the imagery from the viewed scene. As was pointed out above, the array 62 includes separate symbology LEDs 198, which are employed to present separate imagery superimposed on the scene imagery as presented to the user of the device. The symbology LEDs 198 are also arrayed along a vertically extending line. The scene LEDs 62' are forty in number, just like the detector elements 50', and are numbered sequentially from top to bottom of the array 62 for identification purposes on FIG. 10. The symbology LEDs 198 are eighty in number. It must be kept in mind that the visual imagery provided to a user of the device 10 by projection of light from the LEDs 62' and 198 is reflected off of the same facets in the same order of relative angulation and with a similar interlacing effect, as was explained in detail above with respect to the detector 50, detector elements 50', and FIG. 6 The horizontal spacing between LEDs 62' and 198 requires only a small timing variation in the illumination of the LEDs to effect superimposition of the imagery provided by one set of LEDs on the imagery provided by the other set of LEDs. For reasons which will be further explained, the symbology LEDs 198 are arrayed in staggered pairs along two spaced vertical lines, with each pair of symbology LEDs aligning horizontally edge-aligned and immediately on either side of the horizontal center line of one of the scene LEDs 62'.

Figure 10:
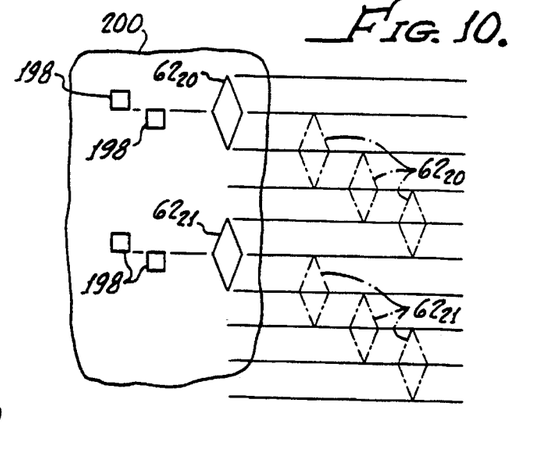
FIG. 10 is a greatly enlarged view of an encircled portion of FIG. 9.

In overview, the array 62 includes a substrate 200 of semiconductor material upon which the LEDs 62' and 198 are formed using conventional fabrication processes. FIG. 10 provides a greatly enlarged view of the array 62. In the view of FIG. 10 it is seen that the scene LEDs 62' are of elongated diamond shape along the vertical dimension of the linear array 62 (i.e., perpendicular to the scan direction of these LEDs effected by scanning mirror 32). The entire diamond-shaped area of the LEDs 62' illuminates substantially uniformly when the LEDs are energized to produce light. Because LEDs are binary operation and are either "fully on" or "fully off" (that is, either fully illuminated or not illuminated at all, with no gradation or dimming in between these two light output levels), pulse width modulation (PWM) is used to control brightness (i.e., grey scale level) of the imagery presented by the LEDs 62'. Pulse width modulation is conventional in many technologies, including conventional scanned LED displays.

However, in contrast to the rectangular detector elements 50', and the cooperation of these rectangular detector elements discussed above with respect of FIG. 6 in scanning adjacent image scan lines which do not overlap (except for the fully overlapping scan lines created by transposition facets of the scanning mirror 32), the diamond-shaped LEDs 62' are elongated and spaced apart such that the light from these LEDs does partially overlap when scanned by the mirror 32. To the right of the fragmentary part of array 62 seen in FIG. 10 is a partial graphical depiction presented in phantom lines of how successive scans of the LEDs 62' overlap one another in the visual field presented to a user of the device 10. This aspect of FIG. 10 will be familiar in concept from the presentation above of FIG. 6. Viewing FIG. 10, it is seen that successive scans of the LED 62'$_{20}$ partially overlap in the vertical direction (perpendicular to the scan direction) so that the upper and lower tips of the LED in alternate scans line are aligned horizontally with one another and so that in successive scans the midpoint of the LED is aligned with the tip of the LED in another scan line (i.e., half-overlapped with one another). The successive scan lines for LED 62'$_{21}$ have the same relationship, and the lowest scan line for LED 62'$_{20}$ has this same half-overlapped relationship with the upper scan line for LED 62'$_{20}$. Effectively, 160 lines of vertical resolution are provided to the user of the device 10.

Considering the area of the LEDs 62' as scanned by the mirror 32, it is easily seen from FIG. 10 that the total area of LEDs 62 in the visual field is constant from top to bottom of the field, with the exception of the top half of the top scan line and the bottom half of the bottom scan line where no overlapping occurs. That is, proceeding vertically of the visual field (partially represented to the right side of FIG. 10), is seen that as the area of one LED increase or decreases, a corresponding decrease or increase of area for an overlapping LED occurs. Similarly, proceeding horizontally of the visual field, this same constancy of LED area occurs because of the diamond shape of the LEDs 62'.

Figure 11:
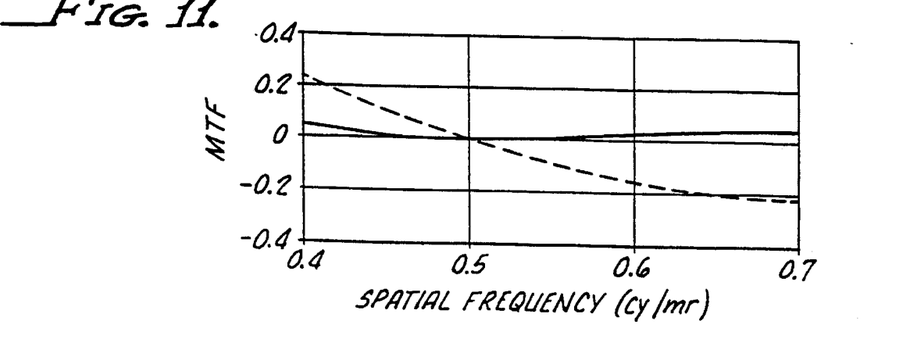
FIG. 11 provides a graphical representation of the vertical uniformity of the visual field presented by a conventional display and by a display embodying the present invention.

As a result, the scene imagery presented to a user of the device 10 has a flat visual field, a visual field which is uniform throughout with respect to the image presented. A conventional test of flatness for such a display field is that the MTF at the raster frequency be less that 2.5%. For the display 58, the nominal raster frequency is 0.5 cy/mr. However, because of angular tolerances for the facets of scanner mirror 32, LED tolerances, and distortions due to the geometry of other components in the device 10, the actual raster frequency will vary. This raster frequency can be expected to vary in the range from 0.47 to 0.53 cy/mr. FIG. 11 presents a graphical presentation of the vertical MTF as a function of spatial frequency for a display having conventional rectangular LEDs and for the display 62 with diamond-shaped LEDs. As can be seen from FIG. 11, the display with rectangular LEDs fails the flat field criteria. On the other hand, the inventive display with diamond-shaped LEDs meets the criteria for a flat visual field within the raster frequency for the device 10.

Considering FIGS. 9 and 10 again it will easily be seen that the pairs of LEDs 198 are not overlapped as scanned in the visual field, but are edge-aligned. That is, the LEDs 198 are arranged in pairs on the substrate 200, with each pair of LEDs 198 being aligned with the horizontal center line of the affiliated one of the diamond-shaped LEDs 62'. Further, the lower edge of the upper LED 198 and the upper edge of the lower LED 198 in each pair are aligned on the horizontal center of the associated LED 62'. The LEDs 198 are only about one-fourth as high in the vertical direction as the diamond-shaped LEDs 62'. Recalling the half-overlap relationship of the LEDs 62' as scanned, it is easily understood that the LEDs 198 as scanned present adjacent edge-aligned scan lines. The vertical resolution of these symbology LEDs 198 is 320 lines. This provides an opportunity to utilize the LEDs 198 to present symbology to the user of the device 10 which is of higher resolution.

Figure 12:
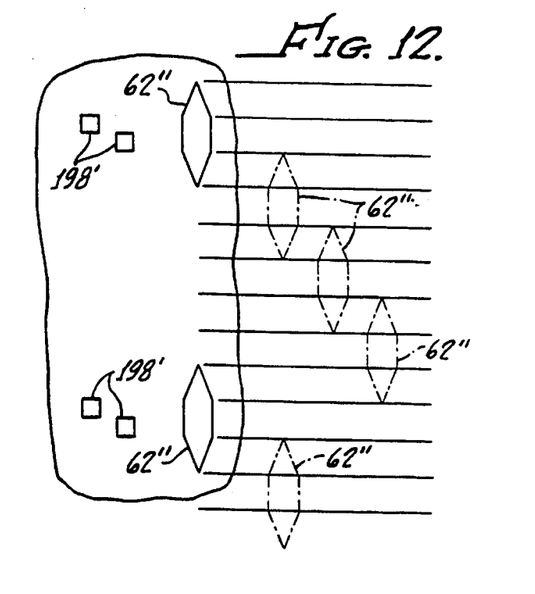
FIG. 12 is a greatly enlarged fragmentary view similar to FIG. 10, but showing an alternative embodiment of the present invention.

FIG. 12 presents a fragmentary view similar to FIG. 10 of an alternative embodiment of the present invention. In order to obtain reference numerals for use in describing this alternative embodiment of the invention, features of FIG. 12 which are the same or which are analogous in structure or function to those depicted and described previously are referenced with the same number used above and having a prime (') added thereto. Viewing FIG. 12, it is seen that the LEDs 62" are configured in a vertically elongated hexagonal shape. To the right side of FIG. 12 is also set out in phantom lines the visual field presented by the LEDs 62" as scanned to a user of the device 10. As can be seen from an examination of FIG. 12, the visual field has a good uniformity of area for the LEDs 62" because, proceeding vertically of the display, as the area of one LED decreases or increases, the area of another partially overlapped LED 62 correspondingly increases or decreases. It will be seen that the LEDs 62" are not half-overlapped as was the case with the LEDs 62'. Instead, the LEDs 62" are partially overlapped. That is, the central rectangular portions of the LEDs 62" (which is of vertically-invariant area) are not overlapped, while the upper and lower triangular portions of the LEDs 62" as presented in each adjacent scan line of the visual field are partially overlapped. Consequently, the area of LED presented in the visual field is substantially invariant in the vertical direction of the display 62' of FIG. 12, as was that case for the display 62 of FIG. 10.

While the present invention has been depicted, described, and is defined by reference to a particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

What is claimed is:

1. A light emitting diode (LED) display apparatus comprising: a linear array of plural spaced apart like scene light emitting diodes (LEDs) defining like spaces between adjacent scene-LEDs, and a scanner scanning light emitted from said scene-LEDs to a viewer with interlacing of light from successive scans so as to fill in the spaces between adjacent scene-LEDs of said array and to provide an image, said scene-LEDs having a geometric configuration varying in width along a length dimension of said linear array.

2. The light emitting diode (LED) display apparatus of claim 1 wherein said geometric configuration of said scene-LEDs is non-rectangular.

3. The light emitting diode (LED) display apparatus of claim 2 wherein said scene-LEDs are diamond-shaped, and are elongated along a length dimension of said linear array.

4. The light emitting diode (LED) display apparatus of claim 3 wherein said diamond-shaped scene-LEDs each define a respective like length dimension along said length dimension of said linear array, said like spaces between adjacent scene-LEDs being substantially equal to said length dimension for said scene-LEDs individually.

5. The light emitting diode (LED) display apparatus of claim 4 wherein said scanner provides a 4:1 interlacing with said diamond-shaped scene-LEDs each defining a transverse centerline and a pair of opposite tips disposed along the length dimension for said linear array, said scanner scanning light from said scene-LEDs to the viewer with a tip of a scene-LED as seen in one scan aligned with a centerline of the same or another one of said plural scene-LEDs as seen in a successive scan.

6. The light emitting diode (LED) display apparatus of claim 2 wherein said scene-LEDs are hexagonal-shaped, and are elongated along a length dimension of said linear array.

7. The light emitting diode (LED) display apparatus of claim 6 wherein said hexagonal-shaped scene-LEDs each define a respective like length dimension along said length dimension of said linear array, said like spaces between adjacent scene-LEDs being substantially equal to one and two-thirds of said length dimension for said scene-LEDs individually.

8. The light emitting diode (LED) display apparatus of claim 7 wherein said scanner provides a 4:1 interlacing with said hexagonal-shaped scene-LEDs each defining a central rectangular portion and a pair of opposite triangular portions each terminating in a respective one of a pair of opposite tips disposed along the length dimension for said linear array, said scanner scanning light from said scene-LEDs to the viewer with a triangular portion of a scene-LED as seen in one scan overlapped with the opposite triangular portion of the same or another one of said plural scene-LEDs as seen in a successive scan.

9. The light emitting diode (LED) display apparatus of claim 1 further including another linear array of symbology light emitting diodes (LEDs) arrayed adjacent to and substantially parallel with said linear array of scene-LEDs, said linear array of symbology-LEDs including a pair of symbology-LEDs associated in lateral alignment with each one of said plural scene-LEDs.

10. The light emitting diode (LED) display apparatus of claim 9 wherein said symbology-LEDs are rectangular with opposite edges parallel and perpendicular to said length dimension for said linear array, said pair of symbology-LEDs associated with each one of said scene-LEDs being edge-aligned with one another and being disposed on opposite sides of a lateral centerline for the associated one of said scene-LEDs.

11. The light emitting diode (LED) display apparatus of claim 10 wherein said pair of symbology-LEDs together have a length along said length dimension for said linear array which is a fractional part of the length dimension for said associated scene-LED.

12. The light emitting diode (LED) display apparatus of claim 11 wherein said pair of symbology-LEDs together have a length along said length dimension for said linear array which is one-half of the length dimension for said associated scene-LED.

13. The light emitting diode (LED) display apparatus of claim 11 wherein said pair of symbology-LEDs together have a length along said length dimension for said linear array which is one-third of the length dimension for said associated scene-LED.

14. A thermal imaging device responsive to invisible thermal infrared radiation from a viewed scene to responsively provide a visible image replicating the scene, said thermal imaging device including a detector array responsive to said thermal infrared radiation and including a linearly-arrayed plurality of spaced-apart detector elements defining cooperatively a length dimension for said detector array, a scanning device scanning said viewed scene across said plurality of detector elements in a direction generally perpendicular to said length dimension, said scanning device on successive scans interlacing portions of said viewed scene as scanned across said plurality of detector elements according to the spacing therebetween to capture image information from all of the scene, each of said plurality of detector elements providing a corresponding individual electrical signal indicative of the thermal infrared radiation incident thereon, and a display apparatus responsively providing a visible-light image replicating the viewed scene, said thermal imaging device comprising: said display apparatus including a linear array of plural spaced apart like scene light emitting diodes (LEDs) defining like spaces between adjacent scene-LEDs, and a scanner scanning light emitted from said scene-LEDs to a viewer with interlacing of light from successive scans so as to fill in the spaces between adjacent scene-LEDs of said array and to provide an image, said scene-LEDs having a geometric configuration varying in width along a length dimension of said linear array.

15. The thermal imaging device of claim 14 wherein said scene-LEDs project light therefrom on said scanning device and to said user of said thermal imaging device, so that said scanner includes said scanning device.

16. The thermal imaging device of claim 14 wherein said geometric configuration of said scene-LEDs is non-rectangular.

17. The thermal imaging device of claim 16 wherein said scene-LEDs are diamond-shaped, and are elongated along a length dimension of said linear array.

18. The thermal imaging device of claim 17 wherein said diamond-shaped scene-LEDs each define a respective like length dimension along said length dimension of said linear array, said like spaces between adjacent scene-LEDs being substantially equal to said length dimension for said scene-LEDs individually.

19. The thermal imaging device of claim 14 further including another linear array of symbology light emitting diodes (LEDs) arrayed adjacent to and substantially parallel with said linear array of scene-LEDs, said linear array of symbology-LEDs including a pair of symbology-LEDs associated in lateral alignment with each one of said plural scene-LEDs.

20. The thermal imaging device of claim 19 wherein said symbology-LEDs are rectangular with opposite edges parallel and perpendicular to said length dimension for said linear array, said pair of symbology-LEDs associated with each one of said scene-LEDs being edge-aligned with one another and being disposed on opposite sides of a lateral centerline for the associated one of said scene-LEDs.

* * * * *